US011945113B2

(12) United States Patent
Nishina

(10) Patent No.: US 11,945,113 B2
(45) Date of Patent: Apr. 2, 2024

(54) PARAMETER ADJUSTMENT DEVICE, PARAMETER ADJUSTMENT METHOD, AND PROGRAM

(71) Applicant: OMRON Corporation, Kyoto (JP)

(72) Inventor: Yuki Nishina, Ikoma (JP)

(73) Assignee: OMRON Corporation, Kyoto (JP)

( * ) Notice: Subject to any disclaimer, the term of this patent is extended or adjusted under 35 U.S.C. 154(b) by 127 days.

(21) Appl. No.: 17/272,974

(22) PCT Filed: Mar. 15, 2019

(86) PCT No.: PCT/JP2019/010916
§ 371 (c)(1),
(2) Date: Mar. 3, 2021

(87) PCT Pub. No.: WO2020/188646
PCT Pub. Date: Sep. 24, 2020

(65) Prior Publication Data
US 2021/0402594 A1  Dec. 30, 2021

(51) Int. Cl.
*B25J 9/16* (2006.01)
*G05B 19/18* (2006.01)
*G05B 19/401* (2006.01)

(52) U.S. Cl.
CPC .......... *B25J 9/1612* (2013.01); *G05B 19/182* (2013.01); *G05B 19/401* (2013.01);
(Continued)

(58) Field of Classification Search
CPC ........................................... G05B 2219/39543
See application file for complete search history.

(56) References Cited

U.S. PATENT DOCUMENTS

2013/0345875 A1* 12/2013 Brooks .................. B25J 9/1671
  700/258
2014/0032281 A1*  1/2014 Shirado .................. G06Q 10/06
  705/7.42
(Continued)

FOREIGN PATENT DOCUMENTS

CN   106826809 A   6/2017
CN   109153123 A   1/2019
(Continued)

OTHER PUBLICATIONS

D. Kent and R. Toris, "Adaptive Autonomous Grasp Selection via Pairwise Ranking," 2018 IEEE/RSJ International Conference on Intelligent Robots and Systems (IROS), Madrid, Spain, 2018, pp. 2971-2976, doi: 10.1109/IROS.2018.8594105. (Year: 2018).*
(Continued)

*Primary Examiner* — Ryan Rink
(74) *Attorney, Agent, or Firm* — ROSSI, KIMMS & McDOWELL LLP

(57) ABSTRACT

Three-dimensional measurement data is obtained (step S1). The poses of bulk parts are calculated (step S2). The gripping poses of a hand relative to the bulk parts are calculated (step S3). Individual evaluation indices are calculated (step S4). Overall evaluation indices are calculated (step S5). The gripping poses are sorted using the overall evaluation indices (step S6). The calculated gripping poses appear on a screen (step S7). The gripping poses are sorted by a user in an intended order (step S8). Determination is performed as to whether the difference between the results of the sorting in step S6 and in step S8 is small (step S9). In response to the difference being sufficiently small, parameters used in the calculation of the overall evaluation indices are stored (step S11). In response to the difference not being
(Continued)

sufficiently small, the parameters are updated (step S10) and the processing returns to step S5.

13 Claims, 11 Drawing Sheets

(52) U.S. Cl.
CPC .............. *G05B 2219/40053* (2013.01); *G05B 2219/40583* (2013.01); *G05B 2219/45063* (2013.01)

(56) References Cited

U.S. PATENT DOCUMENTS

| | | |
|---|---|---|
| 2015/0127162 A1 | 5/2015 | Gotou |
| 2015/0290803 A1* | 10/2015 | Buehler ................. G06F 18/28 700/259 |
| 2017/0136632 A1 | 5/2017 | Wagner |
| 2017/0154397 A1 | 6/2017 | Satou |
| 2017/0334066 A1 | 11/2017 | Levine et al. |
| 2018/0290300 A1* | 10/2018 | Niwayama ............. B25J 9/1687 |
| 2018/0330200 A1* | 11/2018 | Shibata ................. G06F 18/241 |
| 2020/0147798 A1* | 5/2020 | Toris ...................... B25J 9/1682 |
| 2022/0063089 A1 | 3/2022 | Levine et al. |

FOREIGN PATENT DOCUMENTS

| | | |
|---|---|---|
| JP | H07246581 A | 9/1995 |
| JP | 2000061871 A | 2/2000 |
| JP | 2008272886 A | 11/2008 |
| JP | 2009172685 A | 8/2009 |
| JP | 2014240110 A | 12/2014 |
| JP | 2015089589 A | 5/2015 |
| JP | 2015145055 A | 8/2015 |
| JP | 2018144167 A | 9/2018 |
| JP | 2018176311 A | 11/2018 |
| WO | 2018092860 A1 | 5/2018 |

OTHER PUBLICATIONS

International Search Report issued in Intl. Appln. No. PCT/JP2019/010916 dated May 28, 2019. English translation provided.
Written Opinion issued in Intl. Appln. No. PCT/JP2019/010916 dated May 28, 2019. English translation provided.
Nagata. "Grasping an Indicated Object in a Complex Environment." Transactions of the Japan Society of Mechanical Engineers (Series C). 2013: 27-42. vol. 79, Issue 797. Cited in Specification. English abstract provided.
Extended European Search Report issued in European Appln. No. 19919611.4 dated Feb. 15, 2022.
Suarez "Grasp Quality Measures", Mar. 2006, pp. 1-20, XP055887688. Cited in NPL 1.
Office Action issued in Chinese Appln. No. 201980054084.8 dated Nov. 30, 2023. English translation provided.

* cited by examiner

PARAMETER ADJUSTMENT DEVICE, PARAMETER ADJUSTMENT METHOD, AND PROGRAM

FIELD

The present invention relates to a parameter adjustment apparatus, a parameter adjustment method, and a parameter adjustment program.

BACKGROUND

Determining the priorities of gripping positions in gripping position identification may involve evaluation using multiple indices in combination, such as the distance to a gripping target and an approach angle.

For example, Patent Literature 1 describes a technique using a combination of four evaluation indices based on six parameters. Non-Patent Literature 1 describes a technique using a combination of four evaluation indices based on four parameters.

These techniques lack parameter adjustment, and cannot allow easy adjustment by a user to set parameters reflecting intended priority.

CITATION LIST

Patent Literature

Patent Literature 1: Japanese Unexamined Patent Application Publication No. 2015-145055

Non-Patent Literature

Non-Patent Literature 1: Kazuyuki Nagata and six other authors, "Grasping an Indicated Object in a Complex Environment", Transactions of the Japan Society of Mechanical Engineers (Series C), Volume 79, Issue 797 (2013), pp. 27-42

SUMMARY

Technical Problem

In response to the above issue, one or more aspects of the present invention are directed to a technique for gripping in the order of intended priority without complicated parameter adjustment performed by the user.

Solution to Problem

In response to the above issue, a parameter adjustment apparatus according to an aspect of the present invention is a parameter adjustment apparatus for adjusting a parameter included in a first evaluation index for evaluating a gripping pose. The gripping pose is a pose of a robot hand relative to a gripping target gripped by the robot hand. The parameter adjustment apparatus includes a gripping pose calculator that calculates candidates for the gripping pose based on information about a shape of the robot hand, information about a preregistered gripping pose of the robot hand relative to the gripping target, and information about a pose of the gripping target to be gripped by the robot hand, an evaluation index calculator that calculates the first evaluation index for each of the candidates for the gripping pose, a user evaluation obtainer that obtains, from a user, a user evaluation index representing an evaluation on each of the candidates for the gripping pose, and a parameter adjuster that adjusts the parameter included in the first evaluation index based on the user evaluation index.

In the above aspect of the present invention, in response to the user evaluating candidates for the gripping pose and inputting a user evaluation index representing the evaluation, the parameter adjuster adjusts the parameter based on the user evaluation index. This structure eliminates direct parameter adjustment by the user. This allows gripping in the order of intended priority using the first evaluation index including the adjusted parameter, without complicated parameter adjustment performed by the user.

The information about the shape of the robot hand includes a shape model for the robot hand. The information about the preregistered gripping pose of the robot hand relative to the gripping target may be simply preregistered with any method. The information about the pose of the gripping target to be gripped by the robot hand may be obtained with any method, such as using the results of pose identification for the gripping target with measurement data from a three-dimensional sensor and a model, or by directly obtaining the pose from measurement data without using a model.

The robot hand may be, but not limited to, a multi finger hand including, for example, two or three fingers, a suction hand, or a magnetic hand.

In the above aspect of the present invention, the user evaluation index may include a priority assigned to each of the candidates for the gripping pose.

This allows gripping in the order of intended priority with a simple user operation of assigning a priority to each candidate for the gripping pose without any complicated parameter adjustment.

In the above aspect of the present invention, the user evaluation index may include a score assigned to each of the candidates for the gripping pose.

This allows gripping in the order of intended priority with a simple user operation of assigning a score to each candidate for the gripping pose without any complicated parameter adjustment. The score used as an index provides more detailed and precise evaluation on characteristics that cannot be evaluated with priority.

The user evaluation index may include a category assigned to each of the candidates for the gripping pose.

This allows gripping in the order of intended priority with a simple user operation of categorizing candidates for the gripping pose without any complicated parameter adjustment. This operation also reduces the user workload compared with assigning a priority or a score to each individual candidate.

In the above aspect of the present invention, the user evaluation index may represent an evaluation on at least one of the candidates for the gripping pose.

This allows gripping in the order of intended priority with a simple user operation of evaluating at least one of the candidates for the gripping pose without any complicated parameter adjustment. This operation reduces the user workload compared with evaluating all candidates for the gripping pose.

In the above aspect of the present invention, the parameter may be defined for a second evaluation index for evaluating the gripping pose for calculating the first evaluation index, and the parameter adjuster may obtain selection of the second evaluation index from the user, and adjust the parameter based on the selection.

With less data for adjusting the parameter, the user selects the second evaluation index as intended for gripping in the order of intended priority. This is thus reflected in adjusting the parameter defined for the second evaluation index. The user selecting the second evaluation index allows gripping in the order of intended priority, without any complicated parameter adjustment.

A parameter adjustment method according to another aspect of the present invention is a parameter adjustment method for adjusting a parameter included in a first evaluation index for evaluating a gripping pose. The gripping pose is a pose of a robot hand relative to a gripping target gripped by the robot hand. The parameter adjustment method includes calculating candidates for the gripping pose based on information about a shape of the robot hand, information about a preregistered gripping pose of the robot hand relative to the gripping target, and information about a pose of the gripping target to be gripped by the robot hand, calculating the first evaluation index for each of the candidates for the gripping pose, obtaining, from a user, a user evaluation index representing an evaluation on each of the candidates for the gripping pose, and adjusting the parameter included in the first evaluation index based on the user evaluation index.

In the above aspect of the present invention, in response to the user evaluating candidates for the gripping pose and inputting a user evaluation index representing the evaluation, the parameter adjuster adjusts the parameter based on the user evaluation index. This structure eliminates direct parameter adjustment by the user. This allows gripping in the order of intended priority using the first evaluation index including the adjusted parameter, without complicated parameter adjustment performed by the user.

In the above aspect of the present invention, the user evaluation index may include a priority assigned to each of the candidates for the gripping pose.

This allows gripping in the order of intended priority with a simple user operation of assigning a priority to each candidate for the gripping pose without any complicated parameter adjustment.

In the above aspect of the present invention, the user evaluation index may include a score assigned to each of the candidates for the gripping pose.

This allows gripping in the order of intended priority with a simple user operation of assigning a score to each candidate for the gripping pose without any complicated parameter adjustment. The score used as an index provides more detailed and precise evaluation on characteristics that cannot be evaluated with priority.

In the above aspect of the present invention, the user evaluation index may include a category assigned to each of the candidates for the gripping pose.

This allows gripping in the order of intended priority with a simple user operation of categorizing candidates for the gripping pose without any complicated parameter adjustment. This operation also reduces the user workload compared with assigning a priority or a score to each individual candidate.

In the above aspect of the present invention, the user evaluation index may represent an evaluation on at least one of the candidates for the gripping pose.

This allows gripping in the order of intended priority with a simple user operation of evaluating at least one of the candidates for the gripping pose without any complicated parameter adjustment. This operation reduces the user workload compared with evaluating all candidates for the gripping pose.

In the above aspect of the present invention, the parameter may be defined for a second evaluation index for evaluating the gripping pose for calculating the first evaluation index. The parameter adjustment method may further include obtaining selection of the second evaluation index from the user. The adjusting the parameter may include adjusting the parameter based on the selection.

With less data for adjusting the parameter, the user selects the second evaluation index as intended for gripping in the order of intended priority. This is thus reflected in adjusting the parameter defined for the second evaluation index. The user selecting the second evaluation index allows gripping in the order of intended priority, without any complicated parameter adjustment.

A program according to still another aspect of the present invention is a program for causing a computer to implement a parameter adjustment method for adjusting a parameter included in a first evaluation index for evaluating a gripping pose. The gripping pose is a pose of a robot hand relative to a gripping target gripped by the robot hand. The program causes the computer to perform operations including calculating candidates for the gripping pose based on information about a shape of the robot hand, information about a preregistered gripping pose of the robot hand relative to the gripping target, and information about a pose of the gripping target to be gripped by the robot hand, calculating the first evaluation index for each of the candidates for the gripping pose, obtaining, from a user, a user evaluation index representing an evaluation on each of the candidates for the gripping pose, and adjusting the parameter included in the first evaluation index based on the user evaluation index.

In the above aspect of the present invention, in response to the user evaluating candidates for the gripping pose and inputting a user evaluation index representing the evaluation, the parameter adjuster adjusts the parameter based on the user evaluation index. This structure eliminates direct parameter adjustment by the user. This allows gripping in the order of intended priority using the first evaluation index including the adjusted parameter, without complicated parameter adjustment performed by the user.

Advantageous Effects

The above aspects of the present invention allow gripping in the order of intended priority without complicated parameter adjustment performed by the user.

DETAILED DESCRIPTION

Example Use

Figure 3:
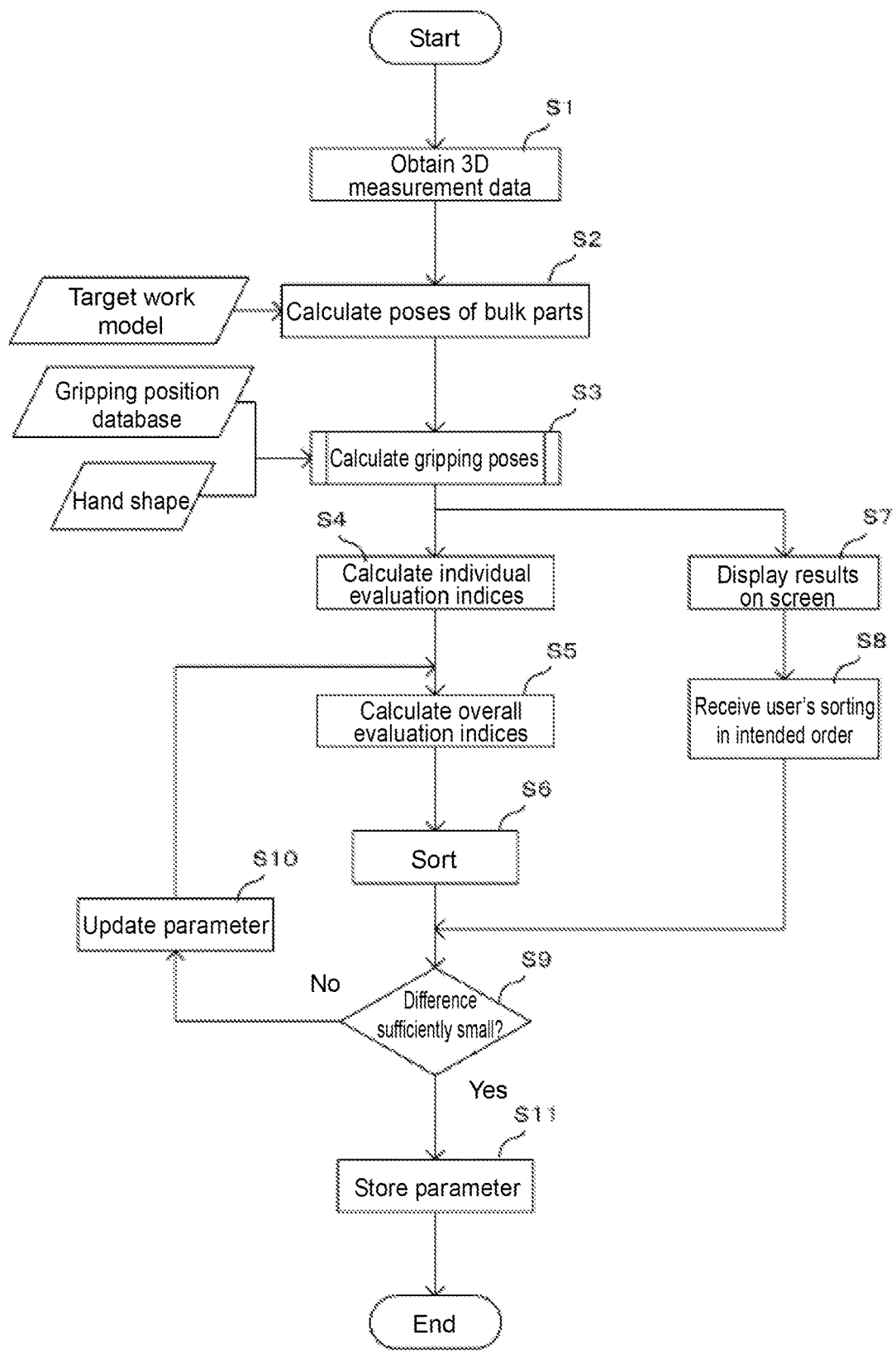
FIG. 3 is a flowchart showing a parameter optimization process in the embodiment of the present invention.

Embodiments of the present invention will now be described with reference to the drawings. FIG. 3 is a flowchart showing a parameter optimization process performed by a parameter adjustment apparatus 1 according to an embodiment of the present invention.

In gripping pose calculation (step S3), all candidates are output for the gripping poses of the hand relative to gripping targets. Individual evaluation indices for these candidates are then calculated for evaluating the gripping poses (step S4). Overall evaluation indices including parameters, each defined for the corresponding individual evaluation index, are then calculated (step S5). The candidates for the gripping poses then appear on a screen of a display 14 (step S7) to receive the sorting of the candidates performed as intended by the user (step S8). The parameters are then updated to minimize the difference between the sorting of the candidates for the gripping poses (step S6) performed using the overall evaluation indices calculated in step S6 and the sorting of the candidates performed by the user (steps S9 and S10).

The user simply sorts, for evaluation, the candidates appearing on the screen in the order of intended priority of the gripping poses of the hand relative to gripping targets. This allows the parameter adjustment apparatus 1 to learn the sorting results and optimize the parameters.

The parameter adjustment apparatus 1 receiving user feedback on the evaluation on the candidates for the gripping poses can thus adjust the parameters toward agreement with the user evaluation. The embodiments are not limited to sorting the candidates for the gripping poses using two-dimensional images of the gripping poses of the hand relative to gripping targets. Various other modifications can also implement outputting the candidates and allowing the user to evaluate the candidates.

First Embodiment

A parameter adjustment apparatus according to an embodiment of the present invention will now be described in more detail with reference to the drawings.

In the embodiment of the present invention, the parameter adjustment apparatus presents all candidates for gripping positions to the user to allow the user to sort the candidates in the order of priority of gripping. The parameter adjustment apparatus optimizes the parameters for combining multiple evaluation indices to adjust the priorities toward closest agreement with the priorities specified by the user. This allows gripping in the order of intended priority without complicated parameter adjustment performed by the user.

Apparatus Structure

Figure 1:
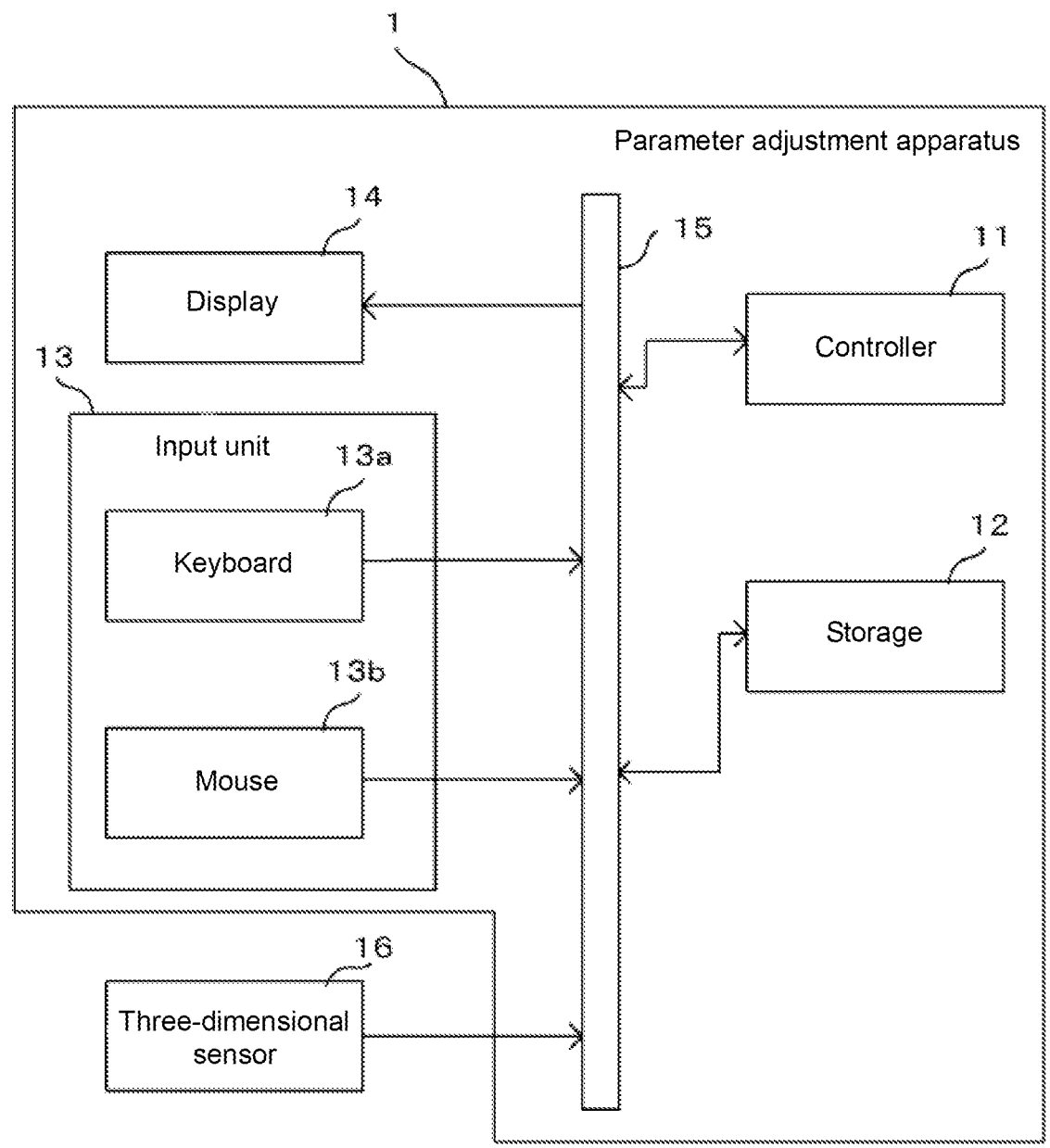
FIG. 1 is a block diagram of a parameter adjustment apparatus according to an embodiment of the present invention showing its hardware configuration.
Figure 2:
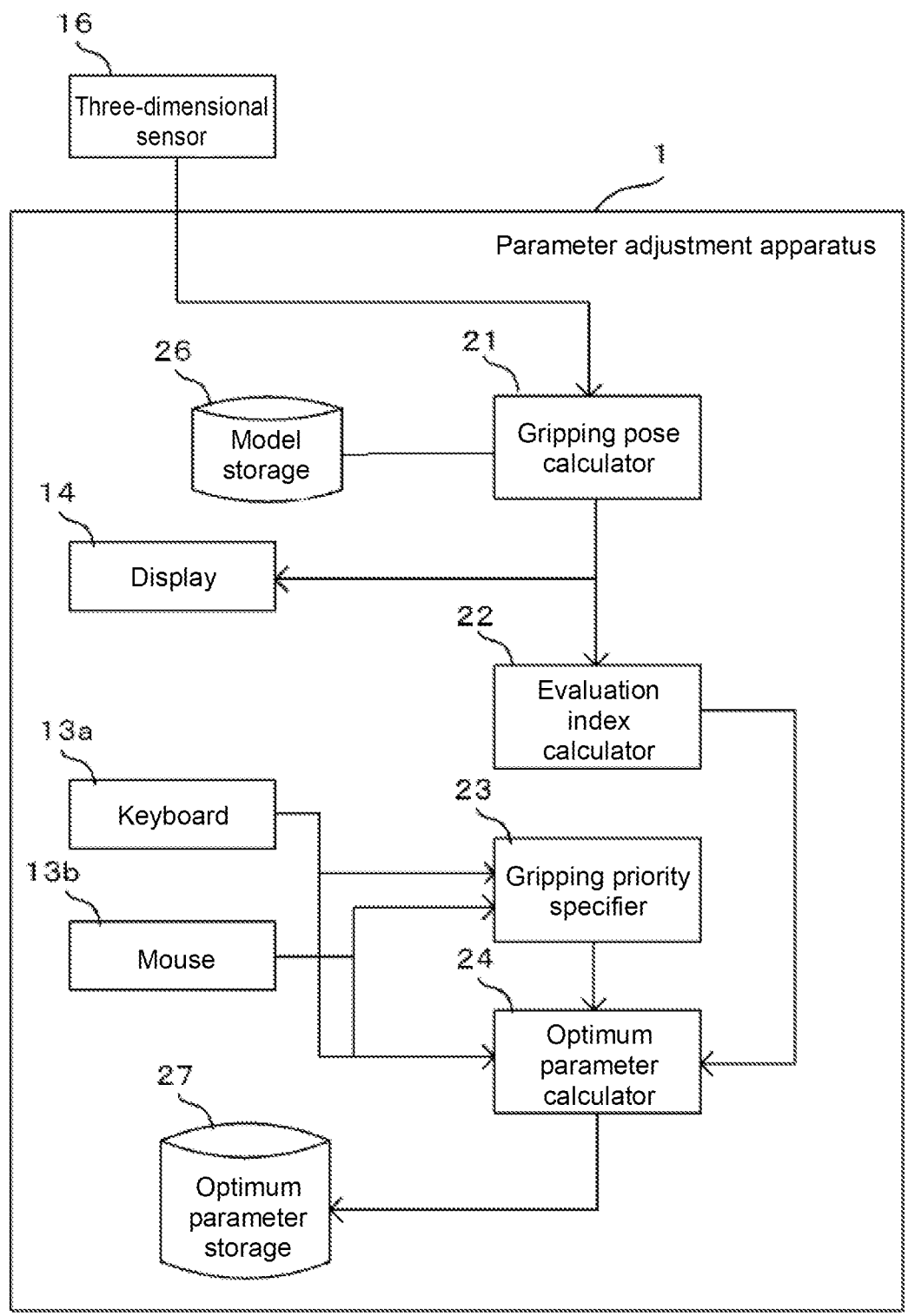
FIG. 2 is a functional block diagram of the parameter adjustment apparatus according to the embodiment of the present invention.

FIG. 1 is a block diagram of the parameter adjustment apparatus 1 according to the present embodiment showing its example hardware configuration. FIG. 2 is a functional block diagram of the parameter adjustment apparatus 1.

As shown in FIG. 1, the parameter adjustment apparatus 1 mainly includes a controller 11, a storage 12, an input unit 13, a display 14, and a bus 15 connected to each component and serving as a signal transmission path. The parameter adjustment apparatus 1 may be implemented using a general-purpose computer. The parameter adjustment apparatus 1 is connected to a three-dimensional sensor 16.

The controller 11 is a processor such as a central processing unit (CPU) and a micro-processing unit (MPU).

The storage 12 includes a main storage device and an auxiliary storage device. The main storage device is a memory in which programs executable by the controller 11 and data used by the control programs are expanded. The auxiliary storage device stores, for example, an operating system (OS), various programs, and various tables, and loads the stored programs to a work area in the main storage device and executes the programs to control, for example, each component, and thus implement each function (described later) for a predetermined purpose. The functions may be partly or entirely implemented by a hardware circuit such as an application-specific integrated circuit (ASIC) and a field-programmable gate array (FPGA). The main storage device may include a random-access memory (RAM) or a read-only memory (ROM). The auxiliary storage device may include an erasable programmable ROM (EPROM) or a hard disk drive (HDD). The auxiliary storage device may additionally include a removable medium, or a portable recording medium. The removable medium may be, for example, a universal serial bus (USB) memory device or a disc storage medium such as a compact disc (CD) and a digital versatile disc (DVD).

The input unit 13 receives input operations from a user. In the present embodiment, the input unit 13 includes a keyboard 13a and a mouse 13b.

The display 14 displays information to provide information to a user. The display 14 includes, for example, a liquid crystal display and its controller. The display 14 may include a touchscreen panel and its controller to also serve as the input unit 13.

The three-dimensional sensor 16 obtains a range image including information about the distance from the three-dimensional sensor to the surface of an object to be measured. The method for such three-dimensional measurement may be, but not limited to, a method using phase shift, time-of-flight (ToF) sensors, or structured random dot patterns. The three-dimensional sensor is connected to the parameter adjustment apparatus 1 using an appropriate wired or wireless communication system. The procedure up to obtaining the range image may be performed by the three-dimensional sensor 16 or may be performed in part by the three-dimensional sensor 16 and by a computer including the parameter adjustment apparatus 1. The three-dimensional sensor 16 may be attached to a tool on a robot hand (described later), or may be fixed at a predetermined position relative to an object to be measured.

Parameter Optimization Process

As shown in the functional block diagram of FIG. 2, the parameter adjustment apparatus 1 according to the present embodiment includes a gripping pose calculator 21, an evaluation index calculator 22, a gripping priority specifier 23, and an optimum parameter calculator 24.

The gripping pose calculator 21 calculates all candidates for the gripping poses of the hand relative to gripping targets (parts placed in bulk, or bulk parts) based on data from the three-dimensional sensor 16 and data stored in a model storage 26 in the storage 12. The model storage 26 stores a gripping target model, a hand model, and a gripping position database. The evaluation index calculator 22 calculates evaluation indices to be used for prioritizing the candidates for gripping poses. The gripping priority specifier 23 receives input from the user for specifying the priorities for all the candidates for gripping poses calculated by the gripping pose calculator 21. In this embodiment, the gripping priority specifier 23 corresponds to a user evaluation obtainer. The optimum parameter calculator 24 calculates and adjusts the parameters that achieve the order of priority for the candidates for gripping poses specified by the user. The calculated optimum parameters are stored into an optimum parameter storage 27 in the storage 12. Each component functions with the controller 11 that executes a predetermined program performing each process (described later) in cooperation with the input unit 13, the display 14, and the three-dimensional sensor 16. FIG. 3 is a flowchart showing a parameter optimization process performed by the parameter adjustment apparatus 1.

First, range images of gripping targets are obtained using the three-dimensional sensor 16 (step S1). The range images herein refer to images including distance information about the distances from the three-dimensional sensor to the gripping targets.

The poses of the bulk parts are then calculated (step S2). The poses of the bulk parts are identified using model data for the gripping targets prepared in the model storage 26 and using measurement data obtained with the three-dimensional sensor 16. The poses of the bulk parts may be identified with any known method. The poses of multiple gripping targets are obtained.

The gripping poses relative to the bulk parts are calculated using the pre-taught gripping poses relative to the gripping targets and using the results of pose identification for the gripping targets obtained with the above process (step S3). The gripping poses may be taught with any method, such as using a teaching pendant or using a gripping simulator. The gripping poses may be determined with object pose identification using a model, or may be determined directly from measurement data without using a model (model-less gripping position identification). Such object pose identification or model-less gripping position identification may be performed with any method.

Figure 4:
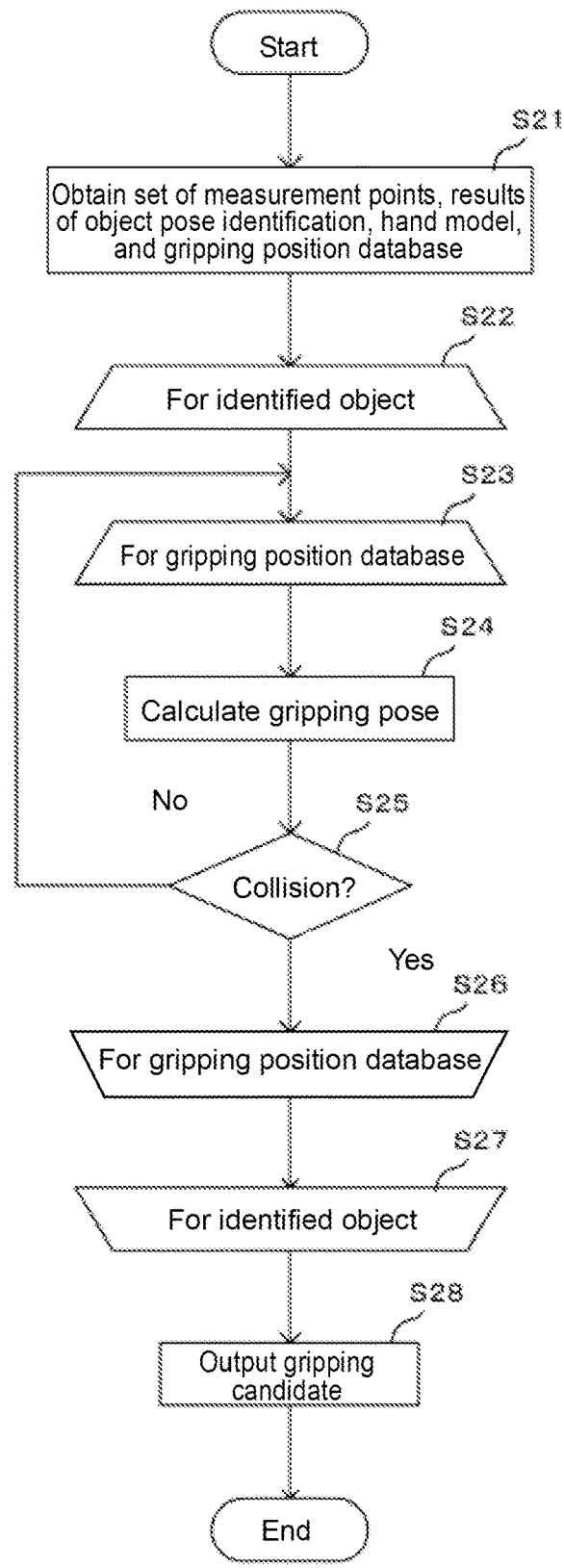
FIG. 4 is a flowchart showing a gripping candidate output process in the embodiment of the present invention.

FIG. 4 shows a gripping candidate output process in the gripping pose calculation.

First, a set of measurement points, the results of object pose identification, the hand model, and the gripping position database are obtained (step S21). The gripping position database stores multiple gripping poses of the hand relative to the gripping targets.

The processing in steps S23 to S26 is repeated for every identified object (steps S22 and S27). The processing in steps S24 and S25 is further repeated for the gripping positions registered to the gripping position database (steps S23 and S26). In other words, the gripping pose of the hand model relative to the gripping target is calculated by referring to the gripping position of the identified object registered to the gripping position database (step S24) to determine whether any collision can occur (step S25). Any gripping position at which collision is determined to occur in step S25 is excluded from the gripping candidates. The gripping position at which no collision is determined to occur in step S25 is output as a gripping candidate for the gripping pose after the processing in steps S22 and S27 and the processing in steps S24 and S26 are performed repeatedly (step S28).

Figure 5:
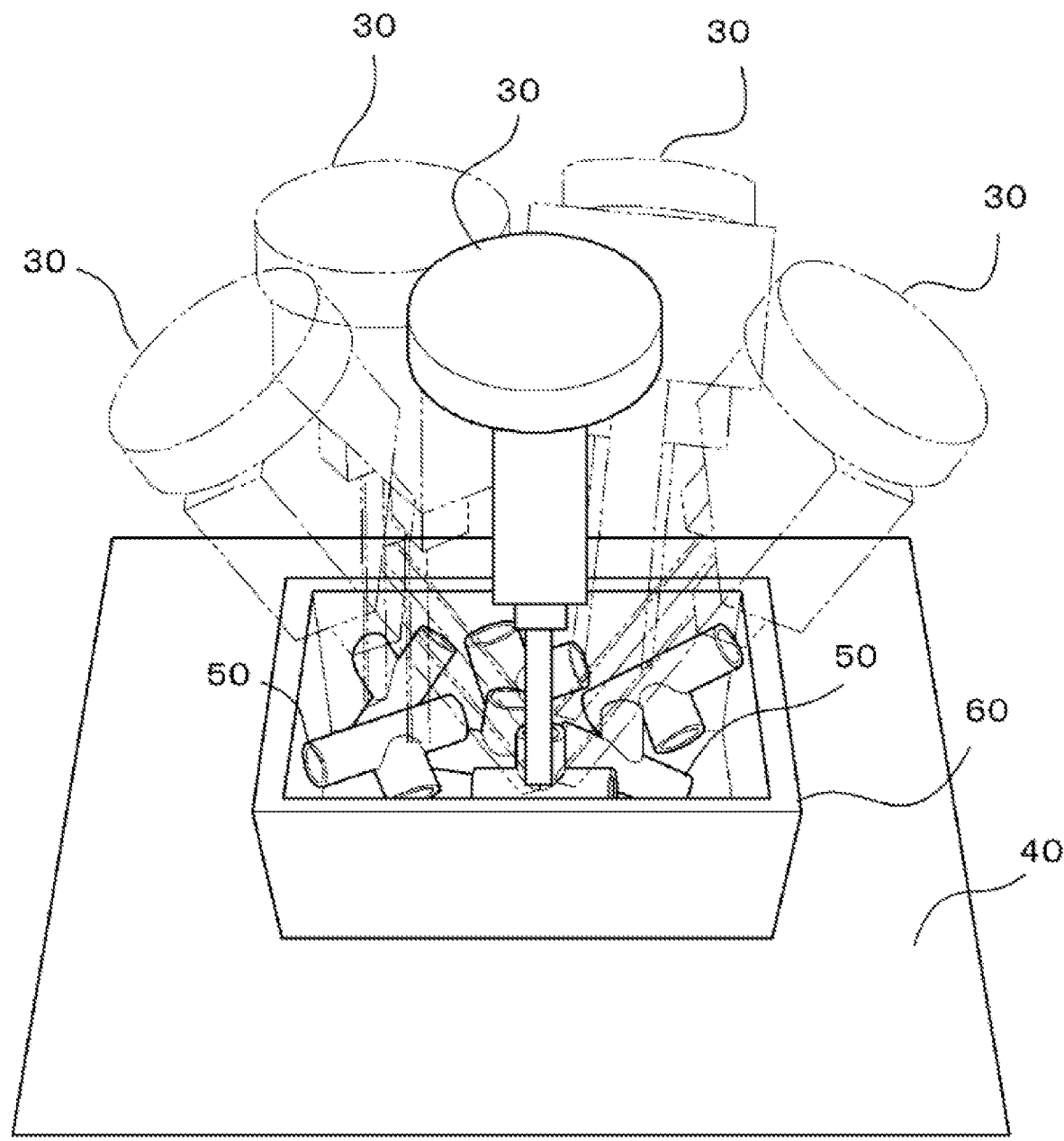
FIG. 5 is a diagram showing an example output of gripping candidates in the embodiment of the present invention.

FIG. 5 shows an example display of the gripping candidates output as described above. In this embodiment, the display shows, as gripping candidates, hands 30 in different poses superimposed on the images of gripping targets 50 stored in bulk in a container 60 on a placement surface 40. The gripping targets are hereafter collectively indicated by reference numeral 50, and the gripping targets in specific poses are indicated by 501 and other reference numerals to distinguish from one another. The hand as a component is indicated by reference numeral 30, and the hands in specific poses as gripping candidates are indicated by 301 and other reference numerals to distinguish from one another. In this embodiment, the gripping candidates exclude any gripping pose of the hand 30 that can collide with neighboring objects or the container 60. Although FIG. 5 shows only five gripping candidates for simplicity, the display actually shows as many gripping candidates as the gripping candidates extracted in step S28.

Individual evaluation indices are then calculated (step S4). In this embodiment, four individual evaluation indices below are calculated. In this embodiment, each individual evaluation index corresponds to a second evaluation index.

Figure 6A:
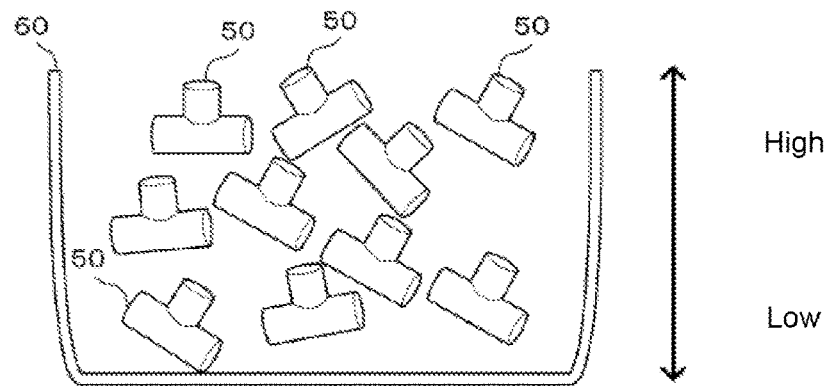
FIGS. 6A to 6C are diagrams each describing an individual evaluation index in the embodiment of the present invention.

An index 1 indicates the object height. The object height herein refers to the height from the floor surface of the container 60 accommodating the objects to the gripping target 50, as shown in FIG. 6A. Taller objects are less likely to cause the bulk of objects to collapse. The height to the gripping target 50 may be determined with respect to the gripping position, the center of gravity, or any portion specified by the user.

Figure 6B:
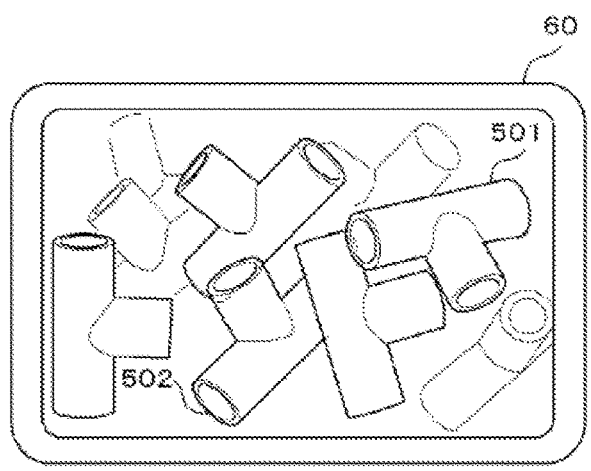

An index 2 indicates the score of object identification. Higher scores provide higher reliability. Object identification with low scores may involve errors in object poses, causing failures to grip or damage to objects. In FIG. 6B, the gripping target 501 is exposed and thus has a high identification score, and the gripping target 502 is behind other objects and thus has a low identification score. Although FIG. 6B is a line diagram for simplicity, the display actually shows an image reflecting the results of object identification.

Figure 6C:
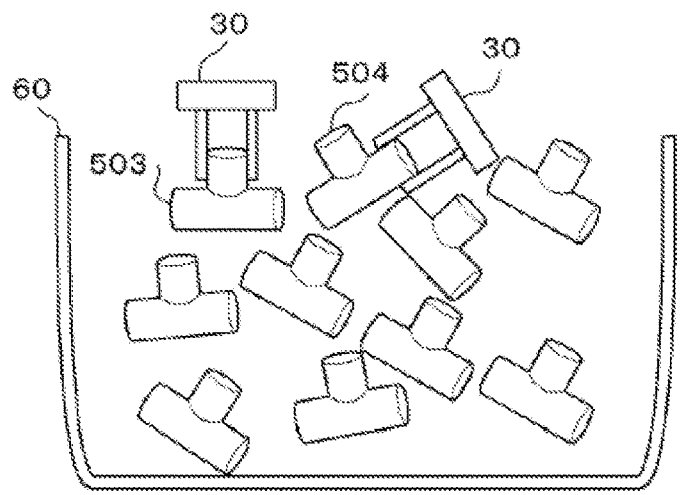

An index 3 indicates the approach angle. The approach angle herein refers to an angle formed by the direction in which the hand 30 approaches an object and the normal to the floor surface of the container 60. Smaller approach angles may be used. Larger approach angles may cause the robot to fail to grip an object or cause the robot gripping an object to collide with neighboring objects or to take a long time to move. In the example shown in FIG. 6C, the gripping target 503 has a small approach angle, and the gripping target 504 has a large approach angle.

Figure 7A:
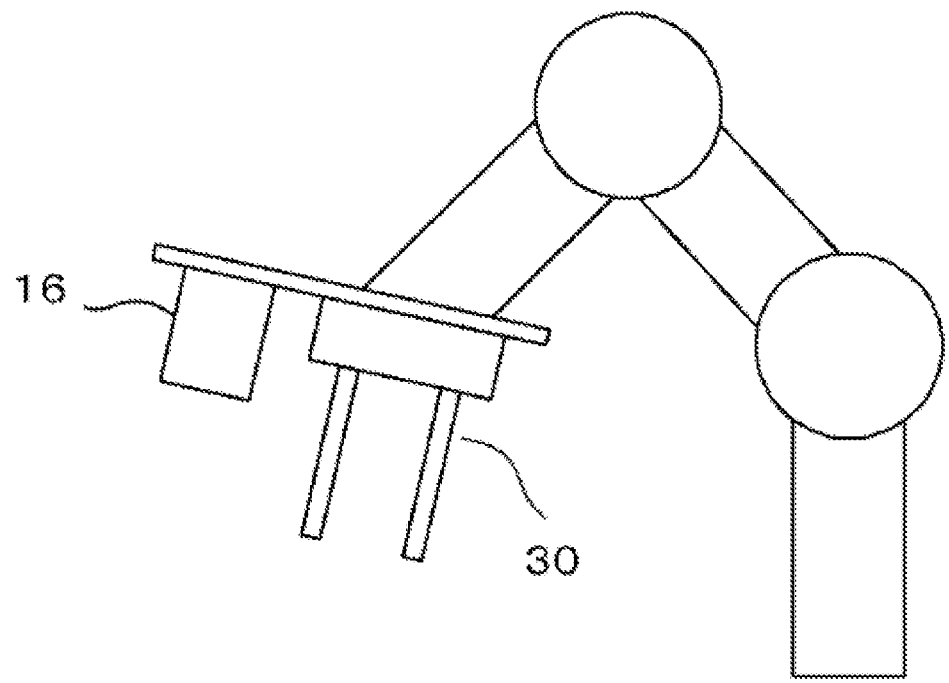
FIGS. 7A and 7B are diagrams each describing another individual evaluation index in the embodiment of the present invention.
Figure 7B:
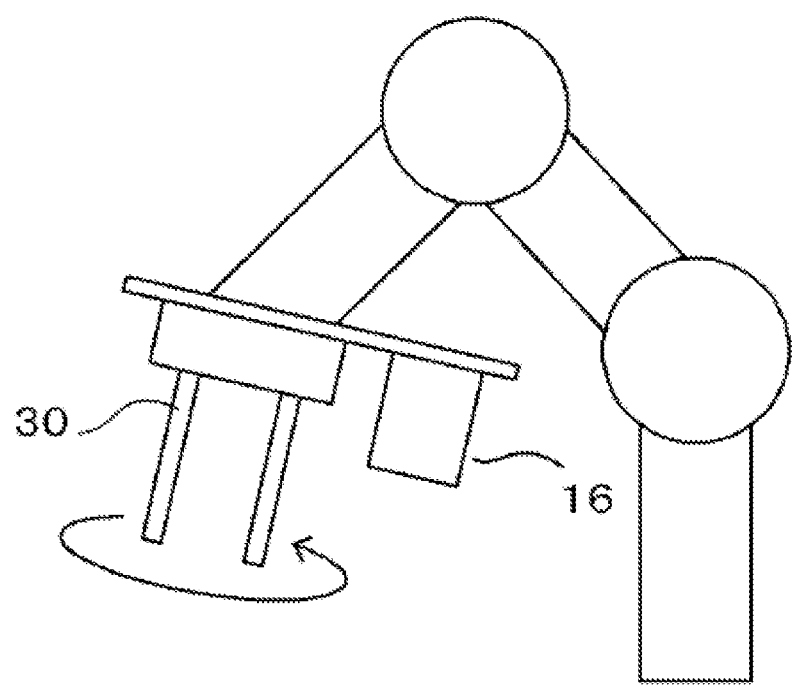

An index 4 indicates the amount of rotation of a tool including the hand. Smaller amounts of rotation of the tool may be used. Larger amounts of tool rotation may cause self-collision or cable entanglement. FIG. 7A shows a tool with an amount of rotation of 0 that is less likely to have self-collision. FIG. 7B shows a tool with an amount of rotation of 180° that may collide with the three-dimensional sensor on the tool.

The individual evaluation indices are not limited to the above indices. For a single gripping target with multiple gripping positions, for example, each gripping position may be used as an index. With fewer sets of measurement points for three-dimensional measurement, the presence of objects may be unclear, possibly causing collision. Thus, the number of sets of measurement points may be used as an evaluation index. The distance to an obstacle such as a container wall may also be used as an evaluation index. Any number or type of evaluation indices may be used.

The overall evaluation indices are then calculated (step S5).

In this embodiment, each overall evaluation index is calculated using the following formula.

overall evaluation index=w1×index 1+w2×index 2+w3×index 3+w4×index 4 where w1, w2, w3, and w4 are indicators (parameters) defined for the respective indices to weight them, and are determined with optimization. For example, w1 to w4 each have an initial value of 1. In this embodiment, each overall evaluation index corresponds to a first evaluation index.

The overall evaluation indices are calculated for all the gripping candidates. The indices are then sorted in descending order of the overall evaluation index (step S6). The algorithm for sorting may be, but not limited to, Quicksort or Bubble sort.

In response to the gripping poses being calculated in step S3, the calculated gripping poses appear on the screen of the display 14 (step S7). Input is then received through the input unit 13 from the user for sorting the gripping poses in an intended order (step S8).

Figure 8A:
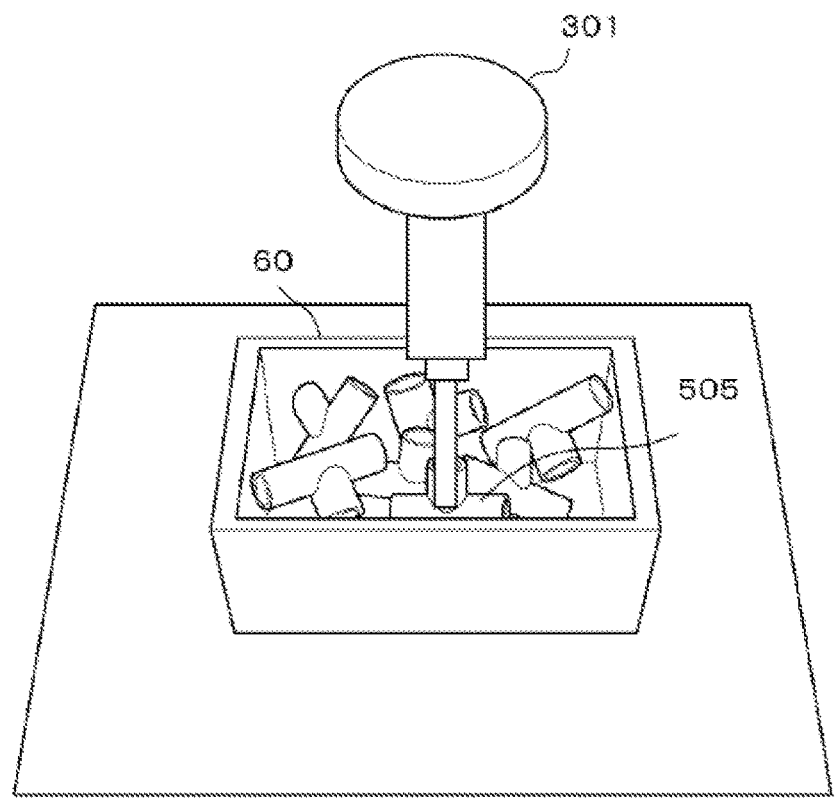
FIGS. 8A and 8B are diagrams each showing a gripping candidate with an example priority in the embodiment of the present invention.
Figure 8B:
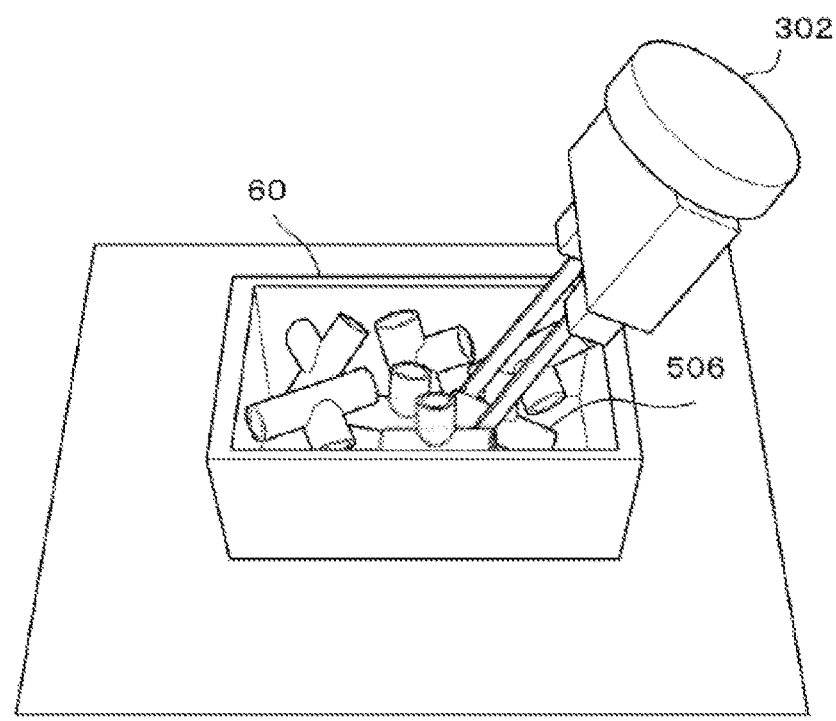
Figure 9A:
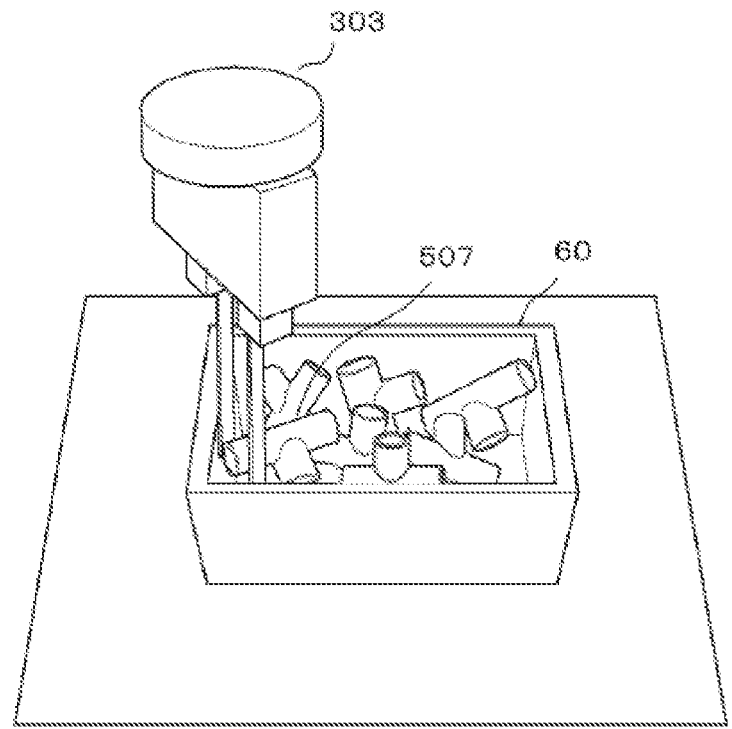
FIGS. 9A and 9B are diagrams each showing a gripping candidate with an example priority in the embodiment of the present invention.
Figure 9B:
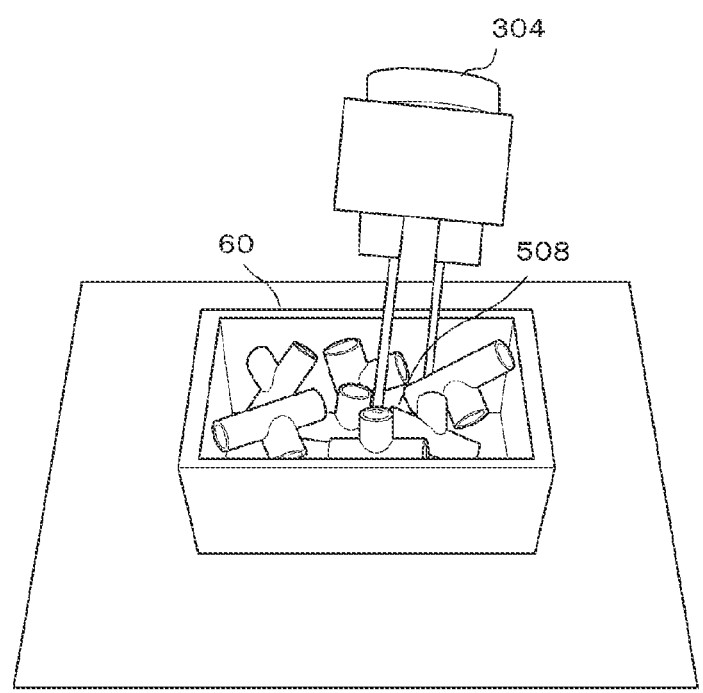

FIG. 5 shows all the calculated gripping candidates appearing on the screen of the display 14. FIG. 5 shows only five gripping candidates for simplicity as described above. In this embodiment, multiple hands 30 appear to be gripping candidates for the gripping targets or T-tubes in the container 60. On this screen, the user sorts the gripping candidates in the order of intended priority. For example, the user sorts the gripping candidates in the order of priority by assigning the first priority to the candidate in FIG. 8A, the second priority to FIG. 8B, the third priority to FIG. 9A, and the least priority to FIG. 9B. In FIG. 8A, a gripping target 505 is in a standing pose and is entirely exposed, and a hand 301 can approach the gripping target 505 vertically from above to stably grip the gripping target 505. Thus, the user evaluates this candidate with the first priority. In FIG. 8B, a gripping target 506 is exposed but is tilted, and a hand 302 is to approach the gripping target 506 at an angle. Thus, the user evaluates this candidate with the second priority. In FIG. 9A, a gripping target 507 is located near the edge of the container 60, and a hand 303 may collide with the container 60. Thus, the user evaluates this candidate with the third priority. In FIG. 9B, a hand 304 is to approach a gripping target 508 at an angle, and the gripping target 508 is buried under other objects. Thus, the user evaluates this candidate with the least priority. In this embodiment, the priority assigned to the gripping pose by the user corresponds to a user evaluation index.

In this embodiment, the user assigns priorities to all the gripping candidates. However, the characteristic of one candidate with a certain priority may degrade greatly from the characteristic of another candidate with the one-level lower priority. The user may evaluate the gripping candidates by assigning scores. The apparatus may thus receive such scores input from the user. The characteristic difference can be evaluated precisely with such scores. In this embodiment, the score assigned to each gripping candidate by the user corresponds to the user evaluation index.

The user may assign categories with different stages, rather than priorities, to all the calculated gripping candidates. Three categories of, for example, good, fair, and poor, may allow simpler evaluation by the user who may have difficulty in prioritizing candidates for detailed evaluation. In this embodiment, the categories with different stages assigned by the user each correspond to a category as the user evaluation index.

In some embodiments, the user may specify priorities for some of the gripping candidates, such as the top five candidates, rather than for all the calculated gripping candidates. This can save the efforts from the user.

Following step S6, the determination is performed as to whether the difference between the result of sorting of the gripping candidates in step S6 and the result of sorting performed by the user in step S8 is sufficiently small (step S9). In response to the determination result being affirmative in step S9, the parameters are determined to have been optimized. The parameters are thus stored into a predetermined area in the storage 12 (step S11). In response to the determination result being negative in step S9, the parameters are updated (step S10). The processing then returns to step S5 to calculate an overall evaluation index. In this embodiment, the steps S6, S9, and S10 correspond to adjusting the parameter.

The determination as to whether the difference between the results of sorting is sufficiently small in step S9 will now be described.

More specifically, $w_{opt}$ (as $w_{opt}$ in the text) satisfying the following Formula 1 is determined, where $$w = \{w1, w2, w3, w4\}. \quad (1)$$

$$w_{opt} = \underset{w}{\operatorname{argmin}}\; \operatorname{cost}(w)$$

where $\operatorname{cost}(w)$ is a cost function. The cost function uses an index to produce a lower cost with a smaller difference between the priority specified by the user and the calculated priority, and to produce a higher cost with a larger difference. For example, the sum of squared errors may be used as follows.

$$\operatorname{cost} = \sum_{\substack{number\ of\\ gripping\\ candidates}} [(\text{priority specified by user}) - (\text{calculated priority})]^2$$

The difference to be particularly smaller for a gripping candidate having a higher priority may be divided by the priority specified by the user in the manner below.

$$\operatorname{cost} = \sum_{\substack{number\ of\\ gripping\\ candidates}} \frac{[(\text{priority specified by user}) - (\text{calculated priority})]^2}{(\text{priority specified by user})}$$

This can add a larger weight to a gripping candidate having a higher priority.

When the cost has a value lower than a predetermined threshold, the difference is determined to be sufficiently small, or in other words, the determination result is affirmative in step S9. The parameter $w_{opt}$ is then stored into the predetermined area in the storage 12 in step S11.

When the cost has a value higher than the predetermined threshold, the difference is determined not to be sufficiently small, or in other words, the determination result is negative in step S9. The parameter is then updated in step S10, and the cost is recalculated through steps S5 and S6. The parameter may be updated with any of various optimization algorithms. Examples of such algorithms include local optimization algorithms such as the method of steepest descent, the Gauss-Newton algorithm, and the Levenberg-Marquardt algorithm, and global optimization algorithms such as simulated annealing and genetic algorithms. Local optimization algorithms allow quicker convergence but are more prone to converge to local solutions than global optimization algorithms.

The parameter may be used to weight an individual evaluation index continuously as described above, or may be used for discrete weighting. For example, each evaluation index may be categorized into the three grades at three points (good), two points (fair), and one point (poor), and the total points may be used as the overall evaluation index. In this case, each evaluation index can be categorized into three grades using two thresholds. The thresholds may be used as the parameters and optimized with the above method.

This allows gripping in the order of intended priority without complicated parameter adjustment performed by the user.

Modifications of Parameter Optimization Process

Figure 10:
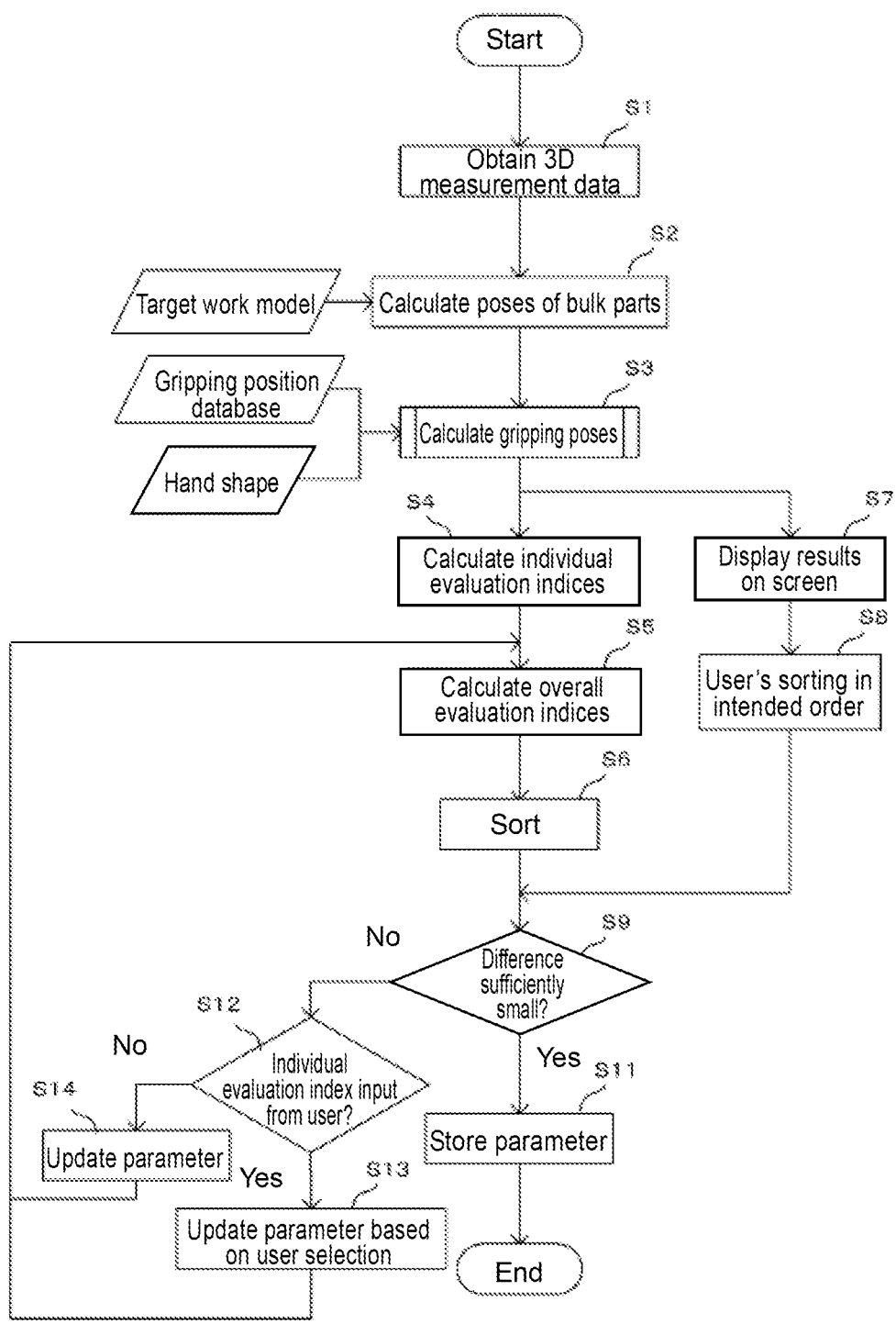
FIG. 10 is a flowchart showing a parameter optimization process in a modification of the present invention.

FIG. 10 is a flowchart showing a parameter optimization process in a modification. The same processes as those in the procedure shown in FIG. 3 are given the same reference numerals, and will not be described in detail.

The parameter adjustment is repeated with the parameter optimization process described above. With a small amount of data, however, the parameters may not allow gripping in the order of intended priority. In this modification, the user can select an individual evaluation index as intended to allow the parameters to be updated to reflect the selection.

In the processing in the modification, the processes in steps S1 to S9 and S11 are the same as those in the parameter optimization process shown in FIG. 3.

In response to the determination result being negative in step S9, the determination is performed as to whether the selection of an individual evaluation index has been received from the user with the input unit 13 (step S12). In this modification, individual evaluation indices appear on the display 14 to allow the user to select and input, with the keyboard 13a and the mouse 13b, an individual evaluation index as intended. The optimum parameter calculator 24 then receives this input. The user may select any number, or one or more than one individual evaluation indices.

In response to the determination result being affirmative in step S12, the parameters are updated to reflect the user selection by, for example, increasing the weighting parameter value for the individual evaluation index selected by the user (step S13). The processing then returns to step S5.

In response to the determination result being negative in step S12, the parameters are updated based on the result in step S9 (step S14). The processing then returns to step S5. In this modification, step S12 corresponds to receiving selection of the second evaluation index from the user, and steps S6, S9, and S12 to S14 correspond to adjusting the parameter.

Figure 11:
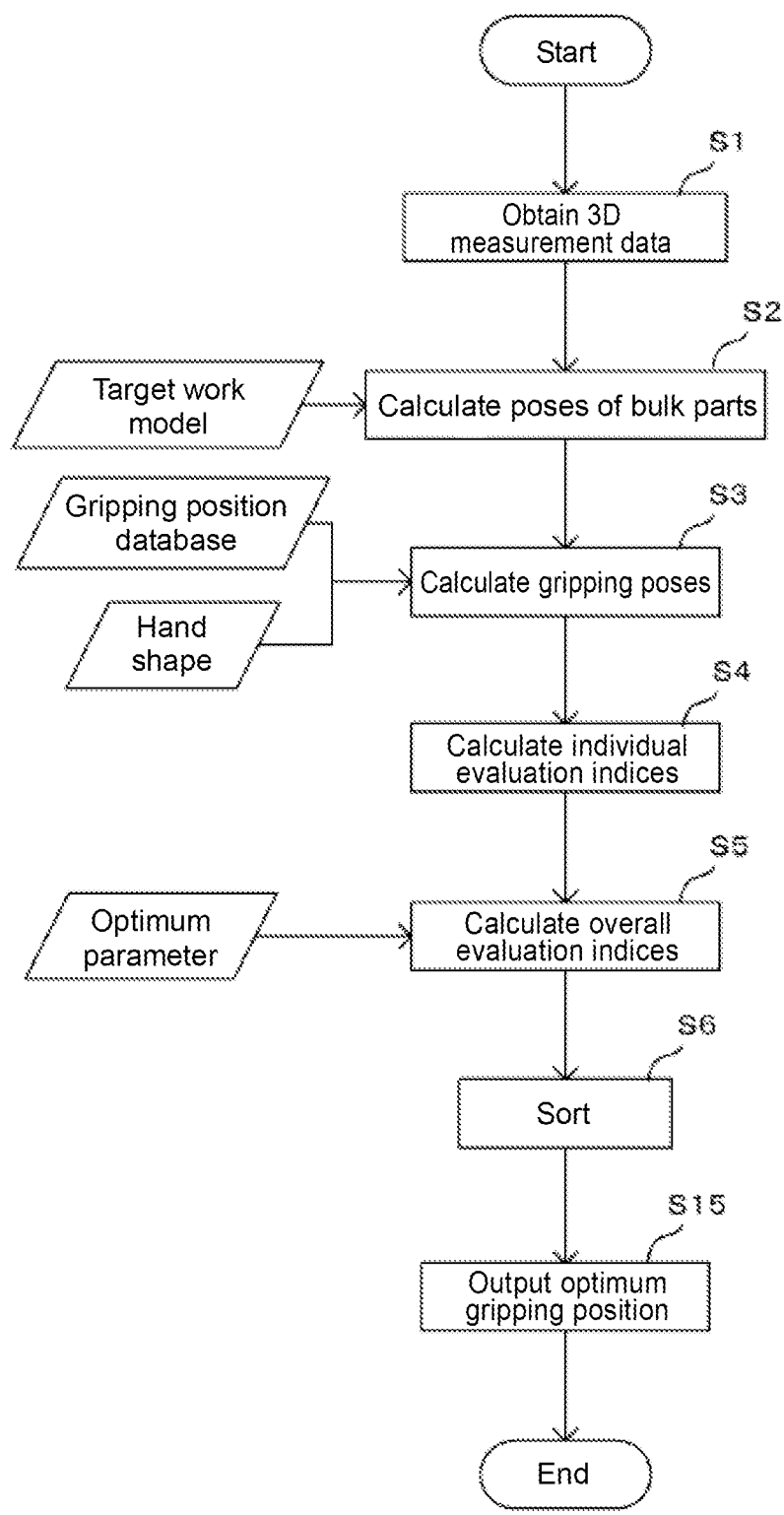
FIG. 11 is a flowchart showing a gripping position identification process using an optimum parameter in the embodiment of the present invention.

With less data, the parameters can reflect gripping in the order of intended priority. Gripping Position Identification Using Optimum Parameter FIG. 11 is a flowchart showing gripping position identification using the parameters determined with the above parameter optimization process.

The same processes as those in FIG. 3 are given the same reference numerals, and will not be described in detail.

In this embodiment, the optimum parameters determined with such a parameter optimization process are read from the storage 12, and the parameters are set to the optimum parameters to calculate each overall evaluation index.

The sorting (step S6) is performed, and the optimum gripping position with the highest overall evaluation index is then output to the controller for the hand (step S15).

The elements in the aspects of the present invention below are identified with reference numerals used in the drawings to show the correspondence between these elements and the components in the embodiments.

Aspect 1

A parameter adjustment apparatus (1) for adjusting a parameter included in a first evaluation index for evaluating a gripping pose, the gripping pose being a pose of a robot hand (30) relative to a gripping target (50) gripped by the robot hand (30), the apparatus (1) comprising:
 a gripping pose calculator (21) configured to calculate candidates for the gripping pose based on information about a shape of the robot hand, information about a preregistered gripping pose of the robot hand relative to the gripping target, and information about a pose of the gripping target to be gripped by the robot hand;
 an evaluation index calculator (22) configured to calculate the first evaluation index for each of the candidates for the gripping pose;
 a user evaluation obtainer (23) configured to obtain, from a user, a user evaluation index representing an evaluation on each of the candidates for the gripping pose; and
 a parameter adjuster (24) configured to adjust the parameter included in the first evaluation index based on the user evaluation index.

Aspect 2

A parameter adjustment method for adjusting a parameter included in a first evaluation index for evaluating a gripping pose, the gripping pose being a pose of a robot hand (30) relative to a gripping target (50) gripped by the robot hand (30), the method comprising:
 calculating candidates for the gripping pose based on information about a shape of the robot hand, information about a preregistered gripping pose of the robot hand relative to the gripping target, and information about a pose of the gripping target to be gripped by the robot hand (step S3);
 calculating the first evaluation index for each of the candidates for the gripping pose (step S5);
 obtaining, from a user, a user evaluation index representing an evaluation on each of the candidates for the gripping pose (step S8); and
 adjusting the parameter included in the first evaluation index based on the user evaluation index (steps S6, S9, and S10).

Aspect 3

A program for causing a computer (1) to implement a parameter adjustment method for adjusting a parameter included in a first evaluation index for evaluating a gripping pose, the gripping pose being a pose of a robot hand (30) relative to a gripping target (50) gripped by the robot hand (30), the program causing the computer (1) to perform operations comprising:

calculating candidates for the gripping pose based on information about a shape of the robot hand, information about a preregistered gripping pose of the robot hand relative to the gripping target, and information about a pose of the gripping target to be gripped by the robot hand (step S3);

calculating the first evaluation index for each of the candidates for the gripping pose (step S5);

obtaining, from a user, a user evaluation index representing an evaluation on each of the candidates for the gripping pose (step S8); and adjusting the parameter included in the first evaluation index based on the user evaluation index (steps S6, 39, and S10).

REFERENCE SIGNS LIST 1 parameter adjustment apparatus
21 gripping pose calculator
22 evaluation index calculator
23 gripping priority specifier
24 optimum parameter calculator
30 hand
50 gripping target

The invention claimed is:

1. A parameter adjustment apparatus for adjusting a parameter included in a first evaluation index for evaluating a gripping pose, the gripping pose being a pose of a robot hand relative to a gripping target gripped by the robot hand, the apparatus comprising a processer configured to implement:

a gripping pose calculator configured to calculate a plurality of candidates for the gripping pose based on information about a shape of the robot hand, information about a preregistered gripping pose of the robot hand relative to the gripping target, and information about poses of a plurality of the same kind of the gripping targets, located in different poses from each other, to be gripped by the robot hand;

an evaluation index calculator configured to calculate the first evaluation index for each of the plurality of candidates for the gripping pose;

a display configured to display the plurality of candidates for the gripping pose relative to the plurality of the same kind of the gripping targets located in the different poses from each other;

a user evaluation obtainer configured to obtain, from a user, a user evaluation index representing an evaluation on at least one of the plurality of candidates for the gripping pose displayed on the display; and a parameter adjuster configured to adjust the parameter included in the first evaluation index based on the user evaluation index.

2. The parameter adjustment apparatus according to claim 1, wherein
the user evaluation index includes a priority assigned to the at least one of the plurality of candidates for the gripping pose.

3. The parameter adjustment apparatus according to claim 1, wherein
the user evaluation index includes a score assigned to the at least one of the plurality of candidates for the gripping pose.

4. The parameter adjustment apparatus according to claim 1, wherein
the user evaluation index includes a category assigned to the at least one of the plurality of candidates for the gripping pose.

5. The parameter adjustment apparatus according to claim 1, wherein
the user evaluation obtainer obtains the user evaluation index representing an evaluation on all of the plurality of candidates for the gripping pose.

6. The parameter adjustment apparatus according to claim 1, wherein
the parameter is defined for a second evaluation index for evaluating the gripping pose for calculating the first evaluation index,
in a case where the parameter adjuster obtains selection of the second evaluation index from the user, the parameter adjuster adjusts the parameter based on the selection, and
in a case where the parameter adjuster does not obtain the selection, the parameter adjuster adjusts the parameter based on the user evaluation index.

7. A parameter adjustment method for adjusting a parameter included in a first evaluation index for evaluating a gripping pose, the gripping pose being a pose of a robot hand relative to a gripping target gripped by the robot hand, the method comprising:

calculating a plurality of candidates for the gripping pose based on information about a shape of the robot hand, information about a preregistered gripping pose of the robot hand relative to the gripping target, and information about poses of a plurality of the same kind of the gripping targets, located in different poses from each other, to be gripped by the robot hand;

calculating the first evaluation index for each of the plurality of candidates for the gripping pose;

displaying the plurality of candidates for the gripping pose relative to the plurality of the same kind of the gripping targets located in the different poses from each other;

obtaining, from a user, a user evaluation index representing an evaluation on at least one of the plurality of candidates for the gripping pose displayed on the display; and adjusting the parameter included in the first evaluation index based on the user evaluation index.

8. The parameter adjustment method according to claim 7, wherein
the user evaluation index includes a priority assigned to the at least one of the plurality of candidates for the gripping pose.

9. The parameter adjustment method according to claim 7, wherein
the user evaluation index includes a score assigned to the at least one of the plurality of candidates for the gripping pose.

10. The parameter adjustment method according to claim 7, wherein
the user evaluation index includes a category assigned to the at least one of the plurality of candidates for the gripping pose.

11. The parameter adjustment method according to claim 7, wherein
the obtained user evaluation index represents an evaluation on all of the plurality of candidates for the gripping pose.

12. The parameter adjustment method according to claim 7, wherein the parameter is defined for a second evaluation index for evaluating the gripping pose for calculating the first evaluation index, and the parameter adjustment method further includes:

determining whether the selection of the second evaluation index from the user is received;

adjusting the parameter based on the selection in a case where the selection is received; and adjusting the parameter based on the user evaluation index in a case where the selection is not received.

13. A non-transitory computer readable medium storing a program for causing a computer to implement a parameter adjustment method for adjusting a parameter included in a first evaluation index for evaluating a gripping pose, the gripping pose being a pose of a robot hand relative to a gripping target gripped by the robot hand, the program causing the computer to perform operations comprising:

calculating a plurality of candidates for the gripping pose based on information about a shape of the robot hand, information about a preregistered gripping pose of the robot hand relative to the gripping target, and information about poses of a plurality of the same kind of the gripping targets, located in different poses from each other, to be gripped by the robot hand;

calculating the first evaluation index for each of the plurality of candidates for the gripping pose;

displaying the plurality of candidates for the gripping pose relative to the plurality of the same kind of the gripping targets located in the different poses from each other;

obtaining, from a user, a user evaluation index representing an evaluation on at least one of the plurality of candidates for the gripping pose displayed on the display; and adjusting the parameter included in the first evaluation index based on the user evaluation index.

* * * * *